United States Patent [19]
Matsumoto et al.

[11] Patent Number: 5,636,515
[45] Date of Patent: Jun. 10, 1997

[54] SEALING STRUCTURE IN EXHAUST SYSTEM OF INTERNAL COMBUSTION ENGINE

[75] Inventors: Seiji Matsumoto; Junichi Nakade; Hiroaki Hishida, all of Wako, Japan

[73] Assignee: Honda Giken Kogyo Kabushiki Kaisha, Tokyo, Japan

[21] Appl. No.: 505,648

[22] Filed: Jul. 21, 1995

[30] Foreign Application Priority Data

Jul. 22, 1994 [JP] Japan .................. 6-171096

[51] Int. Cl.[6] ............................ F01N 7/10; F16J 15/12
[52] U.S. Cl. ................... 60/323; 277/167.5; 277/235 B
[58] Field of Search ................ 60/322, 323; 277/235 B, 277/167.5

[56] References Cited

U.S. PATENT DOCUMENTS

| | | | |
|---|---|---|---|
| 3,940,927 | 3/1976 | Maurhoff | 60/323 |
| 4,214,444 | 7/1980 | Fujioka | 60/322 |
| 4,387,904 | 6/1983 | Nicholson | 60/323 |
| 4,866,934 | 9/1989 | Lindstedt | 60/323 |
| 5,087,058 | 2/1992 | Miura | 277/235 B |
| 5,360,219 | 11/1994 | Okuda | 277/235 B |

FOREIGN PATENT DOCUMENTS 63-10249  1/1983  Japan .

*Primary Examiner*—Douglas Hart
*Attorney, Agent, or Firm*—Nikaido, Marmelstein, Murray & Oram LLP

[57] ABSTRACT

A sealing structure in an exhaust system of an internal combustion engine includes a gasket which is clamped between a cylinder head and a flange fastened to the cylinder head and which has a sealing portion surrounding an exhaust port opening into a side of the cylinder head, and an exhaust pipe which is curved and coupled to the flange and which is in communication with the exhaust port. In this sealing structure, the sealing portion of the gasket is formed into an endless shape to surround said exhaust port, such that the distance between the sealing portion and a peripheral edge of the exhaust port, at least at a location substantially corresponding to a projected position of the exhaust pipe on the flange, is larger than the distance at other locations. Thus, it is possible to prevent or minimize the deterioration of the sealing portion of the gasket due to heat, while avoiding an increase in size of the section associated with the exhaust system.

6 Claims, 14 Drawing Sheets

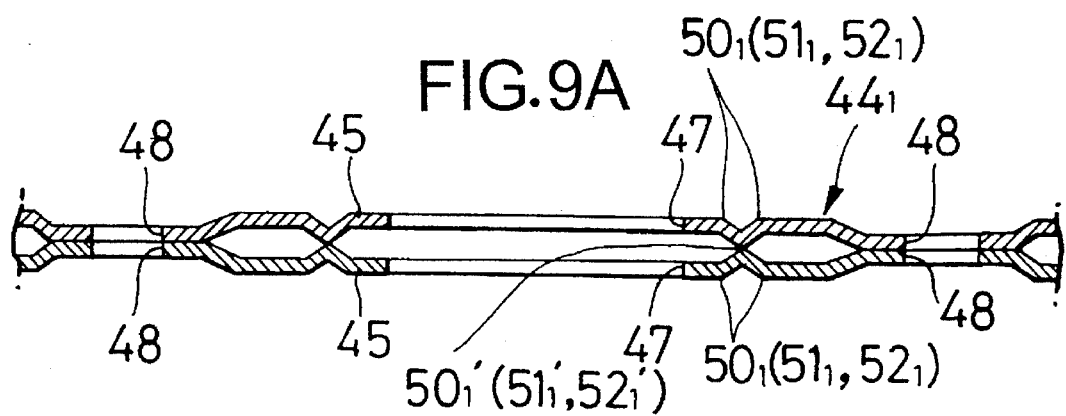
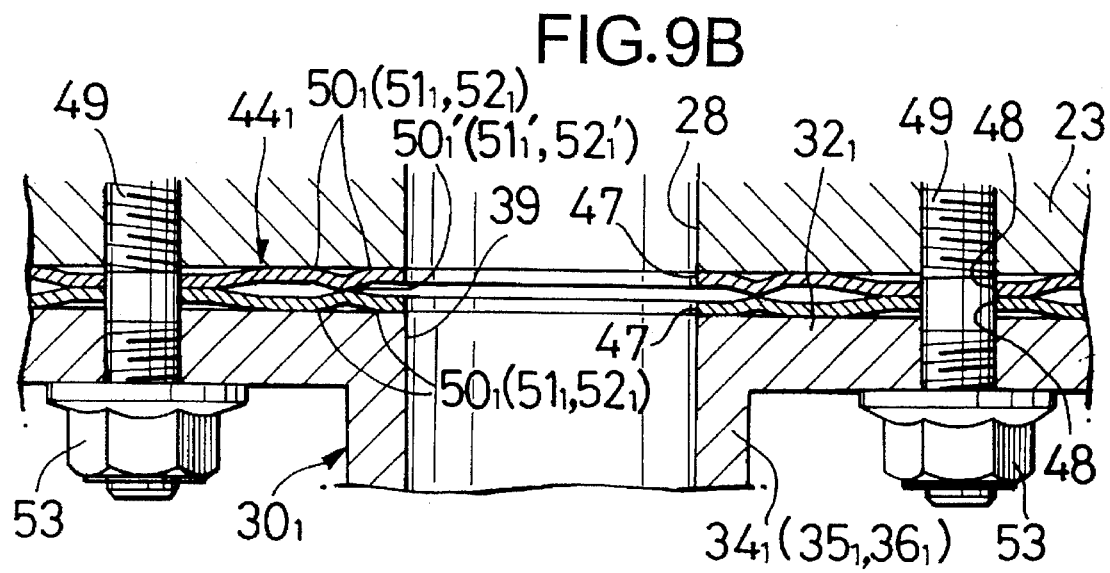
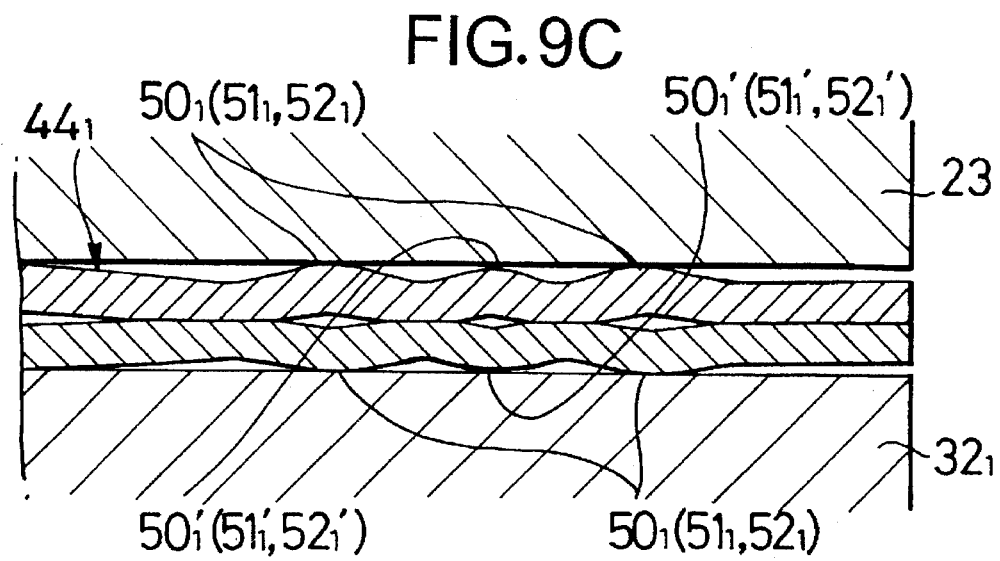

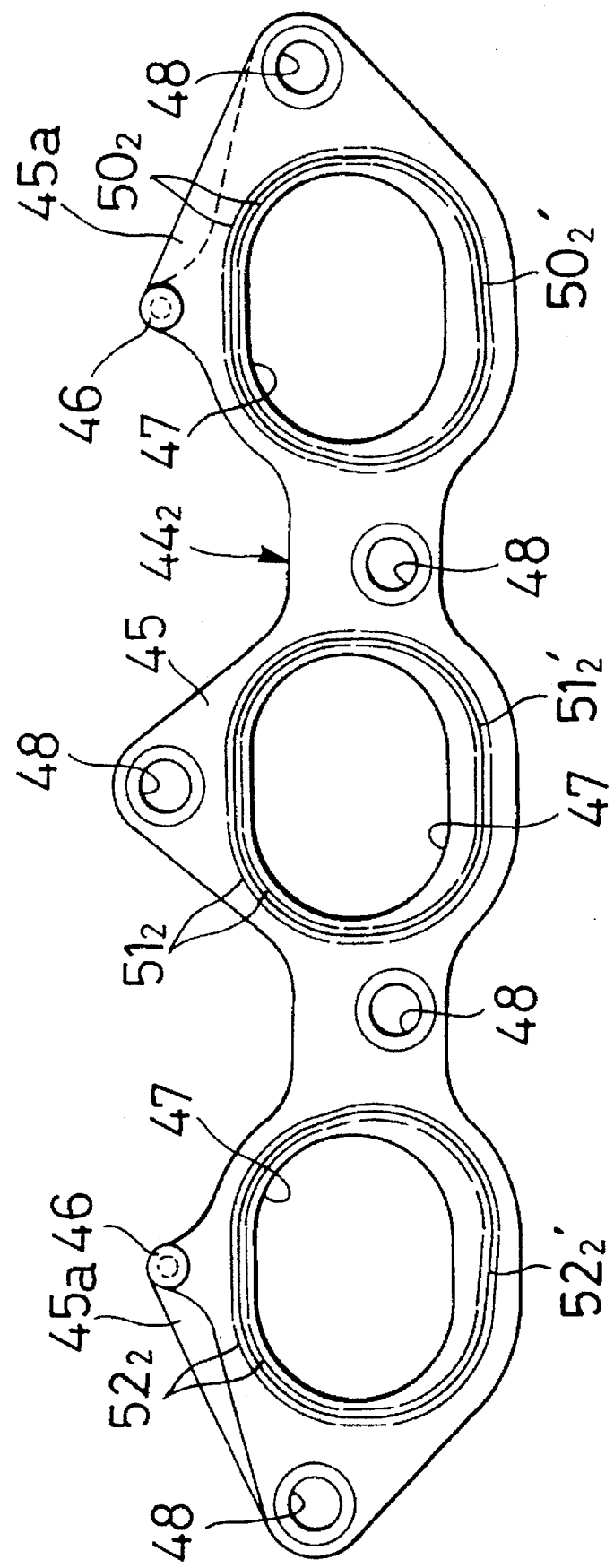

SEALING STRUCTURE IN EXHAUST SYSTEM OF INTERNAL COMBUSTION ENGINE

BACKGROUND OF THE INVENTION

1. Field of the Invention

The present invention relates to a sealing structure in an exhaust system of an internal combustion engine, including a gasket which is clamped between a cylinder head and a flange which is fastened to the cylinder head. The gasket has a sealing portion surrounding an exhaust port opening into a side of the cylinder head. An exhaust pipe which is curved, is coupled to the flange and is in communication with the exhaust port.

2. Description of the Prior Art

Sealing structures in exhaust systems are conventionallly known, for example, from Japanese Utility Model Application Laid-Open No. 10249/88. In the known sealing structure, a bead portion is provided as a sealing portion in a gasket clamped between the cylinder head and the flange to surround the exhaust port, wherein the distance between the bead portion and a peripheral edge of the exhaust port is uniform in the circumferential direction.

However, the exhaust pipe is in close proximity to the flange in the area corresponding to the projected position of the exhaust pipe on the flange, and hence, at such location, heat from the exhaust pipe may be transferred to the flange. Moreover, heat may be accumulated in a space between the curved exhaust pipe and the cylinder head or a cylinder block. For this reason, when the gasket having the sealing portion which surrounds the exhaust port with a circumferentially uniform distance between the sealing portion and the peripheral edge of the exhaust port, is used as in the known sealing structure, the temperature of the sealing portion rises to a higher level in the area corresponding to the projected position of the exhaust pipe on the flange and hence, such area of the sealing portion is liable to be deteriorated, as compared with other areas. To prevent the deterioration of the sealing portion, the distance between the sealing portion and the peripheral edge of the exhaust port may be set at a relatively large value. However, if the distance is made large, the size of the gasket itself is increased and there is a need for increasing the size of the flange, and the distance between exhaust ports in the cylinder head. This results in an increased size of the engine body.

SUMMARY OF THE INVENTION

Accordingly, it is an object of the present invention to provide a sealing structure in an exhaust system of an internal combustion engine, wherein the deterioration of the sealing portion of the gasket due to heat can be prevented, while avoiding an increase in size of the exhaust system.

To achieve the above object, according to the present invention, there is provided a sealing structure in an exhaust system of an internal combustion engine which includes a gasket which is clamped between a cylinder head and a flange fastened to the cylinder head. The gasket having a sealing portion surrounding an exhaust port opening into a side of the cylinder head. An exhaust pipe which is curved is coupled to the flange and is in communication with the exhaust port. The sealing portion of the gasket is formed into an endless shape to surround the exhaust port, such that the distance between the sealing portion and a peripheral edge of the exhaust port at least at a location substantially corresponding to a projected position of the exhaust pipe on the flange, is larger than at other locations.

With such a construction, in an area of the exhaust pipe in proximity to the flange, the sealing portion is disposed at a location spaced apart from a high-temperature exhaust gas flow from the exhaust port to the exhaust pipe. Therefore, it is possible to prevent the temperature of the sealing portion at the location substantially corresponding to the projected position of the exhaust pipe on the flange, from being locally raised by inhibiting the transfer of heat from the high-temperature exhaust gas flow, thereby optimizing the prevention of the deterioration of the sealing portion. In addition, the size of the sealing portion is only partially increased and therefore, it is possible to avoid a large increase in the size of the gasket itself and also to avoid an increase in the size of an engine body.

The above and other objects, features and advantages of the invention will become apparent from the following description of preferred embodiments taken in conjunction with the accompanying drawings.

BRIEF DESCRIPTION OF THE DRAWINGS

FIGS. 9A, 9B and 9C are views sequentially illustrating steps of deformation of the gasket;

FIG. 10 is a front view of a gasket, similar to FIG. 5, but according to a second embodiment of the present invention;

DESCRIPTION OF THE PREFERRED EMBODIMENTS

The present invention will now be described by way of preferred embodiments with reference to the accompanying drawings.

Figure 1:
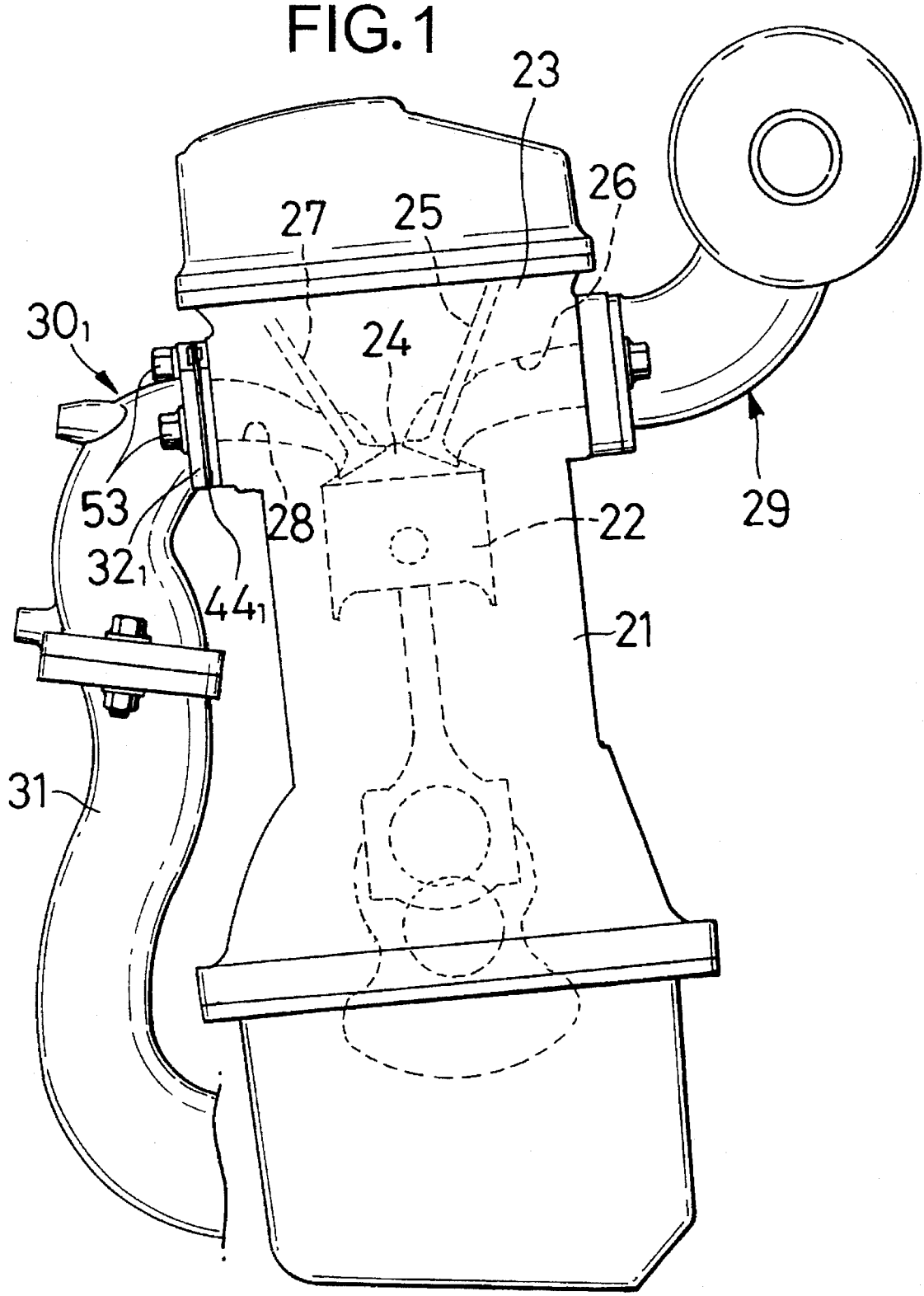
FIG. 1 is a side view of an internal combustion engine to which a first embodiments of the present invention is applied.

Referring first to FIG. 1 illustrating a first embodiment, combustion chambers 24 are defined between a plurality of, e.g., three pistons 22 slidably fitted in a cylinder block 21 of an internal combustion engine, and a cylinder head 23 coupled to an upper surface of the cylinder block 21, respectively. Intake ports 26 open into one of sides of the cylinder head 23 and are put into and out of communication with the corresponding combustion chambers 24 in a switched manner through intake valves 25, respectively. Exhaust ports 28 open into the other side of the cylinder head 23 and are put into and out of communication with the corresponding combustion chambers 24 in a switched manner through exhaust valves 27, respectively. An intake manifold 29 is flange-coupled to the one side of the cylinder head 23 and is aligned with the intake ports 26. An exhaust manifold $30_1$ is flange-coupled at one end thereof to the other side of the cylinder head 23 and is aligned with the exhaust ports 28. A collective exhaust pipe 31 is flange-coupled to the other end of the exhaust manifold $30_1$.

Figure 2:
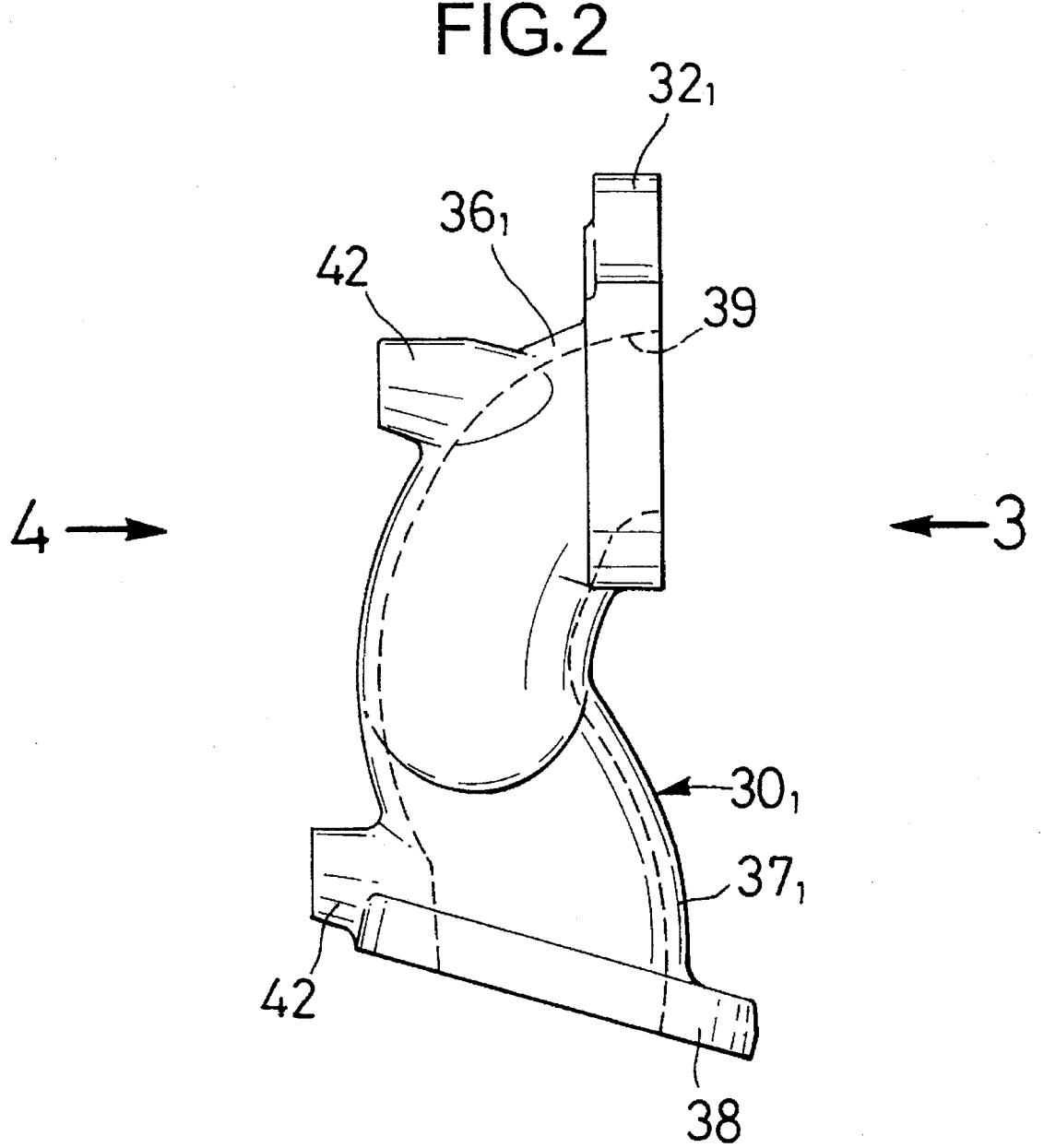
FIG. 2 is a side view of an exhaust manifold.
Figure 3:
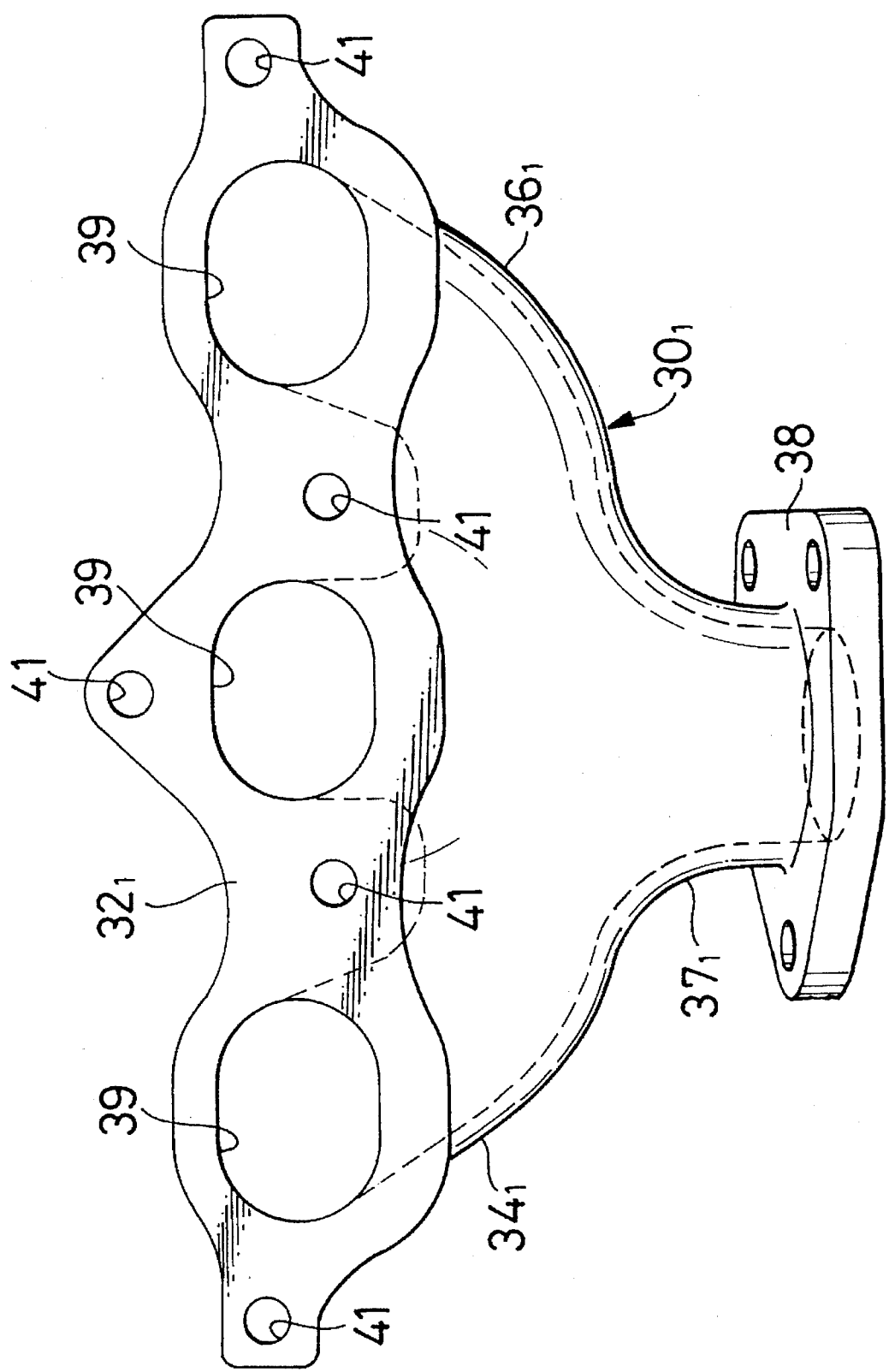
FIG. 3 is a view taken in a direction of an arrow 3 in FIG. 2.
Figure 4:
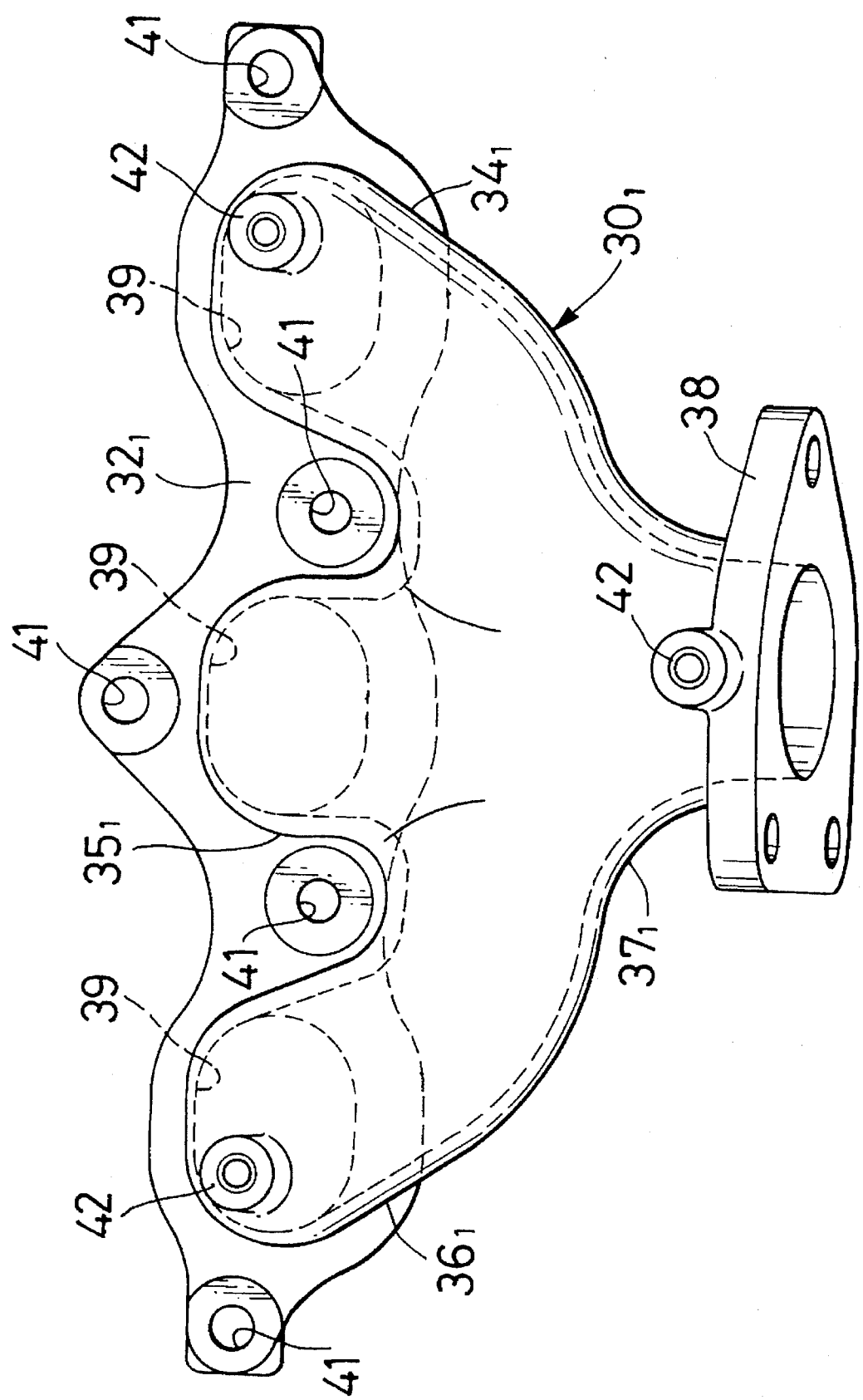
FIG. 4 is a view taken in a direction of an arrow 4 in FIG. 2.

Referring also to FIGS. 2, 3 and 4, the exhaust manifold $30_1$ is formed, for example, by casting, and is integrally provided with a flange $32_1$ which is fastened to the cylinder head 23. Three exhaust pipes $34_1$, $35_1$, and $36_1$ are coupled at one end thereof to the flange $32_1$ in correspondence to the exhaust ports 28, a collection pipe $37_1$ is coupled to the exhaust pipes $34_1$, $35_1$, and $36_1$, and a flange 38 is coupled to the collection pipe $37_1$ for flange-coupling to the collective exhaust pipe 31.

The flange $32_1$ includes three communication holes 39 provided therein which independently lead to the exhaust ports 28 in the cylinder head 23, and insertion holes 41 are also provided therein for insertion of a plurality of bolts 49 (see FIG. 9) for fastening of the flange $32_1$ to the cylinder head 23. Support bosses 42 are provided on the exhaust pipes $34_1$ and $36_1$ and on an connection between the collection pipe 37 and the flange 38. A heat shield plate (not shown) is fixedly supported on the support bosses 42 to cover the exhaust manifold $30_1$.

The exhaust pipes $34_1$, $35_1$, and $36_1$ extend to the three parallel arranged communication holes 39. The exhaust pipe $35_1$, central in a direction of parallel arrangement, is curved downwardly from the flange $32_1$, and the exhaust pipes $34_1$ and $36_1$ on the opposite sides of the exhaust pipe $35_1$ are curved so as to approach the exhaust pipe $35_1$ more and more in a downward direction.

A gasket $44_1$ is clamped between the flange $32_1$ of the exhaust manifold $30_1$ and the cylinder head 23. The construction of the flange $44_1$ will be described below.

Referring to FIGS. 5 to 9, the gasket $44_1$ is comprised of two metal plates 45, 45 coupled to each other by rivets 46, 46. Each of the metal plates 45 is provided with holes 47 corresponding to the exhaust ports 28 in the cylinder head 23, and insertion holes 48 through which the bolts 49 are inserted. The metal plates 45, 45 are in close contact with each other at portions coupled by the rivets 46 and at portions surrounding the insertion holes 48. Sealing points $50_1'$, $51_1'$, and $52_1'$ and sealing portions $50_1$, $50_1$; $51_1$, $51_1$; and $52_1$, $52_1$ located at the ends of inclined planar surface portions on opposite sides of the sealing points $50_1'$, $51_1'$, and $52_1'$, are provided on opposite sides of the gasket $44_1$ around the holes 47.

The metal plates 45, 45 are formed in the same shape in order to enhance the productivity thereof, but are formed in a laterally non-symmetric contour. More specifically, the metal plates 45 have an ear portion 45a provided at one side with respect to the arrangement of the holes 47, so that a normal assembling can be confirmed by the fact that the ear portions 45a, 45a of the metal plates 45, 45 do not overlap on each other when the metal plates 45, 45 are overlapped on each other with the sealing portions $50_1$, $51_1$ and $52_1$ being matched with each other, respectively.

When no fastening force is applied to the gasket $44_1$, i.e., in a condition in which forces in the direction of movement of the metal plates 45, 45 toward each other are not applied, mutually corresponding sealing points $50_1'$, $51_1'$ and $52_1'$ protrude from the metal plates 45, 45 in directions to abut against each other, respectively, as shown in FIGS. 6 to 8 and FIG. 9A. When nuts 53 threadedly engaged with the bolts 49 are tightened in a condition in which the bolts 49 screwed into the cylinder head 23 have been inserted through the insertion holes 48 in the gasket $44_1$ and also through the insertion holes 41 in the flange $32_1$ for clamping the gasket $44_1$ between the flange $32_1$ itself and the cylinder head 23, as shown in FIG. 9A, mutually abutting forces of the sealing points $50_1'$, $51_1'$, and $52_1'$ are increased. In response to this, abutting forces of the sealing portions $50_1$, $50_1$; $51_1$, $51_1$; and $52_1$, $52_1$ against the flange $32_1$ and the cylinder head 23 are increased, as shown in FIG. 9C.

Thus, when the flange $32_1$ has been fastened to the cylinder head 23 with the gasket $44_1$ clamped therebetween, the sealing portions $50_1$, $51_1$ and $52_1$ on one surface of the gasket $44_1$ are put into close contact with the cylinder head 23 so as to surround the exhaust ports 28, while the sealing portions $50_1$, $51_1$, and $52_1$ on the other surface of the gasket $44_1$ are put into close contact with the flange $32_1$ so as to surround the holes 47.

Figure 5:
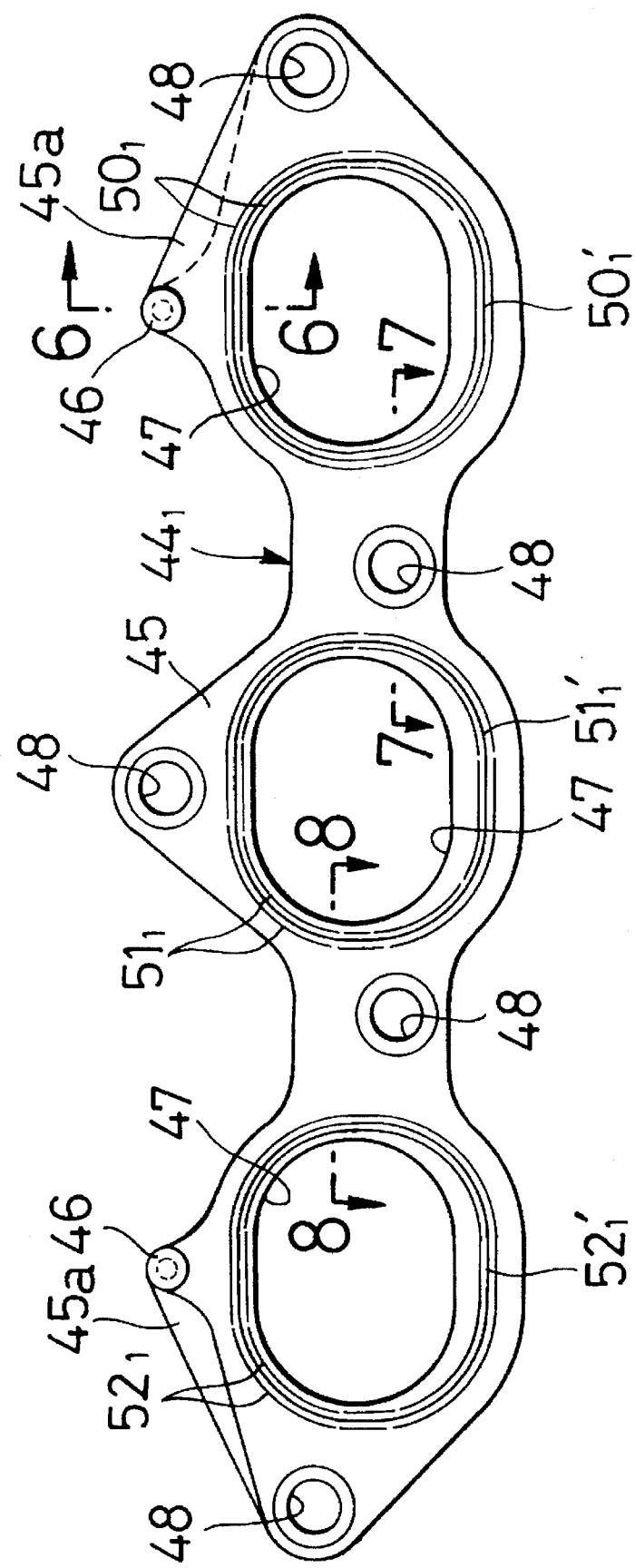
FIG. 5 is a front view of a gasket.
Figure 6:
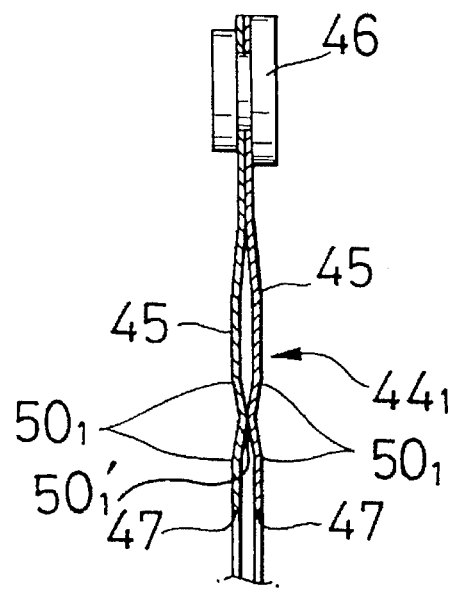
FIG. 6 is an enlarged sectional view taken along a line 6—6 in FIG. 5.
Figure 7:
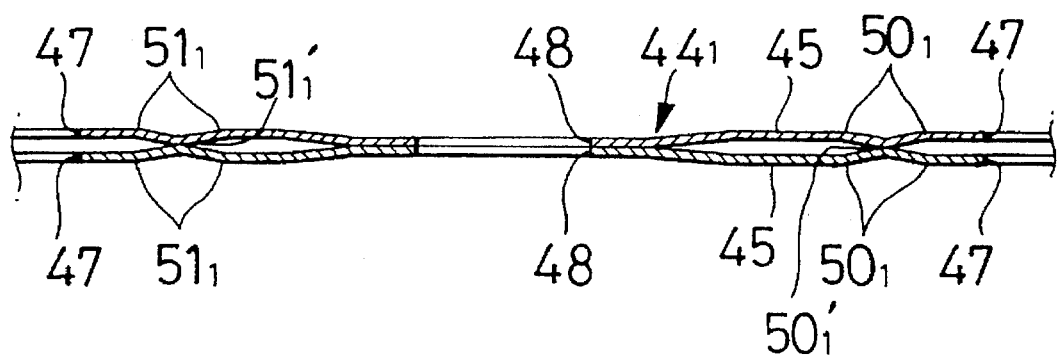
FIG. 7 is an enlarged sectional view taken along a line 7—7 in FIG. 5.
Figure 8:
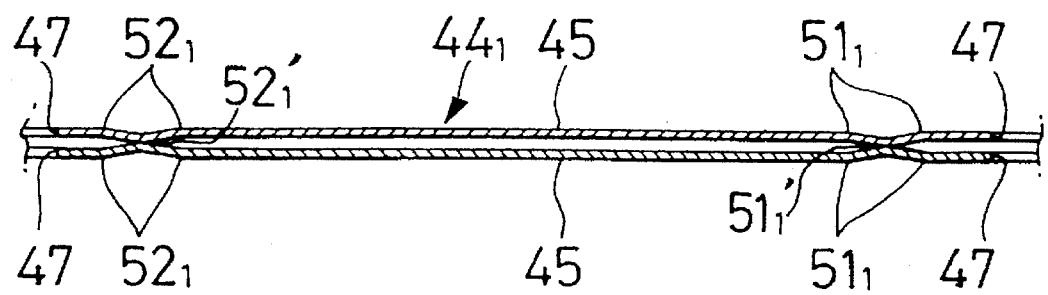
FIG. 8 is an enlarged sectional view taken along a line 8—8 in FIG. 5.

According to the present invention, each of the sealing portions $50_1$, $50_1$ corresponding to the exhaust pipe $34_1$ of the exhaust manifold $30_1$ is formed into an endless shape such that the distance between the sealing portion $50_1$ and a peripheral edge of the exhaust port 28 at a lower location, substantially corresponding to a projected position of the curved exhaust pipe $34_1$ on the flange $32_1$, is larger than the distance at other locations, as shown in FIG. 5. In addition, each of the sealing portions $51_1$, $51_1$ corresponding to the exhaust pipe $35_1$ of the exhaust manifold $30_1$ is also formed into an endless shape such that the distance between the sealing portion $51_1$ and a peripheral edge of the exhaust port 28, at a lower location substantially corresponding to a projected position of the curved exhaust pipe $35_1$ on the flange $32_1$, is larger than the distance at other locations. Further, each of the sealing portions $52_1$, $52_1$ corresponding to the exhaust pipe $36_1$ of the exhaust manifold $30_1$ is also formed into an endless shape such that the distance between the sealing portion $52_1$ and a peripheral edge of the exhaust portion 28, at a lower location substantially corresponding to a projected position of the curved exhaust pipe $36_1$ on the flange $32_1$, is larger than the distance at other locations.

The operation of the first embodiment will be described below. The exhaust pipes $34_1$, $35_1$, and $36_1$ of the exhaust manifold $30_1$ are in close proximity to the flange $32_1$ at the projected position of the exhaust pipes $34_1$, $35_1$, and $36_1$ on the flange $32_1$ by the curvature of the exhaust pipes $34_1$, $35_1$ and $36_1$, and hence, heat from the exhaust pipes $34_1$, $35_1$, and $36_1$ may be transferred to the flange $32_1$ at the locations corresponding to the projected positions. In addition, heat may be accumulated between the exhaust pipes $34_1$, $35_1$, and $36_1$ and the cylinder head 23 or the cylinder block 21 due to the curvature of the exhaust pipes $34_1$, $35_1$, and $36_1$.

However, each of the sealing portions $50_1$, $50_1$; $51_1$, $51_1$; and $52_1$, $52_1$ is formed into an endless shape such that the distance between such sealing portion and a peripheral edge of the exhaust pipe 28, at the location substantially corresponding to the projected position of each curved exhaust pipe $34_1$, $35_1$, and $36_1$ on the flange $32_1$, is larger than the distance at other portions, as described above. Therefore, at that portion of each of the exhaust pipes $34_1$, $35_1$, and $36_1$ which is in proximity to the flange $32_1$, each of the sealing portions $50_1$, $50_1$; $51_1$, $51_1$; and $52_1$, $52_1$ is disposed at a position relatively spaced apart from a high-temperature exhaust gas flow from each of the exhaust ports 28 to each of the exhaust pipes $34_1$, $35_1$, and $36_1$, so that heat transferred from the high-temperature exhaust gas flow can be reduced. Therefore, even in a position where the heat is liable to be transferred, the temperature of the sealing points $50_1'$, $51_1'$, and $52_1'$ at the locations corresponding to the projected positions of the exhaust pipes $34_1$, $35_1$, and $36_1$ onto the flange $32_1$ can be prevented from rising and hence, the deterioration of the sealing portions $50_1$, $50_1$; $51_1$, $51_1$; and $52_1$, $52_1$ can be prevented or minimized as much as possible.

Moreover, for the prevention of the deterioration of the sealing portions $50_1$, $50_1$; $51_1$, $51_1$; and $52_1$, $52_1$, the sizes of the sealing points $50_1'$, $51_1'$, and $52_1'$ and the sealing portions $50_1$, $50_1$; $51_1$, $51_1$; and $52_1$, $52_1$ on the opposite sides thereof are only partially increased. Therefore, it is possible to inhibit an increase in size of the gasket $44_1$ itself as much as possible, and it is not necessary to increase the distance between the exhaust ports 28, thereby avoiding an increase in size of an engine body including the cylinder head 23 and the cylinder block 21.

FIG. 10 illustrates a second embodiment of the present invention. In the second embodiments, sealing portions $50_2$, $50_2$; $51_2$, $51_2$; and $52_2$, $52_2$ are provided on opposite surfaces of a gasket $44_2$ around holes 47, so that they are located at the ends of inclined planar surface portions on the opposite sides of the sealing points $50_2'$, $51_2'$, and $52_2'$. Each of the sealing portions $50_2$, $50_2$; $51_2$, $51_2$; and $52_2$, $52_2$ is formed in an endless shape such that the distance between the sealing portion and a peripheral edge of the exhaust portion 28, at a location substantially corresponding to a projected position of each curved exhaust pipe $34_1$, $35_1$, $36_1$ on the flange $32_1$, is larger the distance at other locations.

Even in the second embodiment, an effect similar to that in the first embodiment can be provided.

Figure 11:
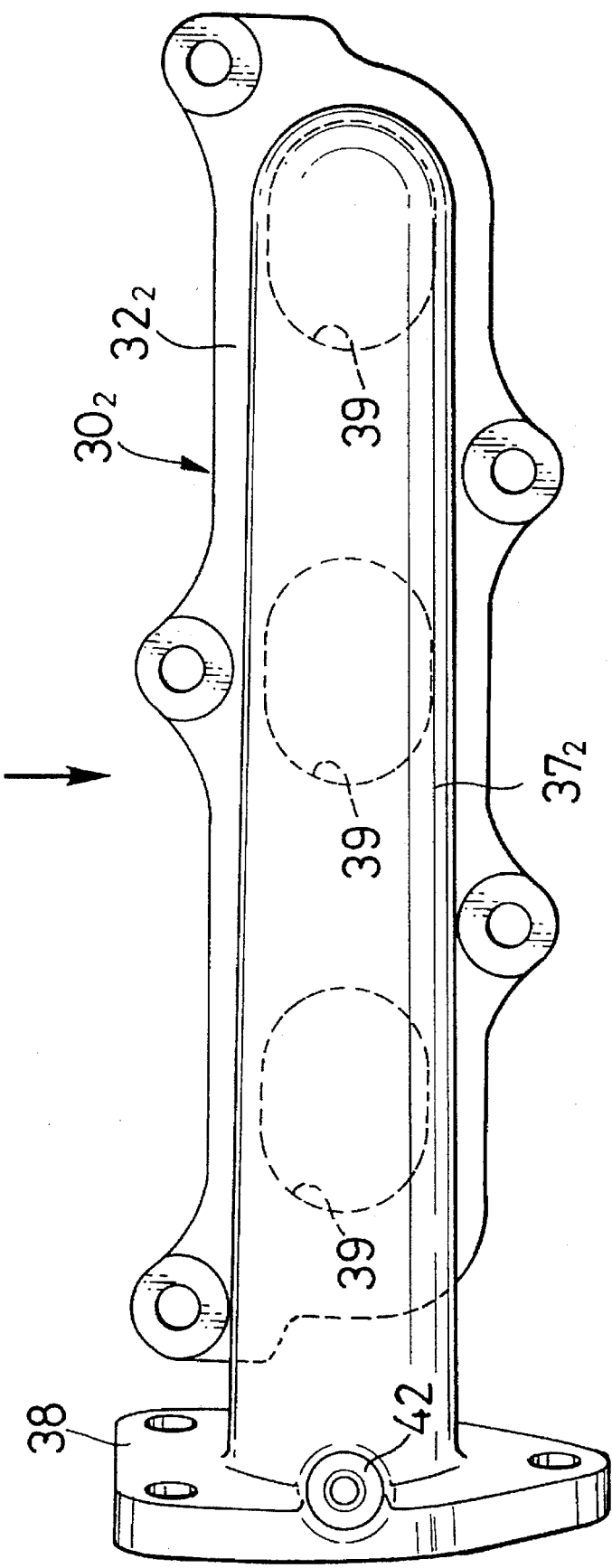
FIG. 11 is a front view of an intake manifold, similar to FIG. 4, but according to a third embodiment of the present invention.
Figure 12:
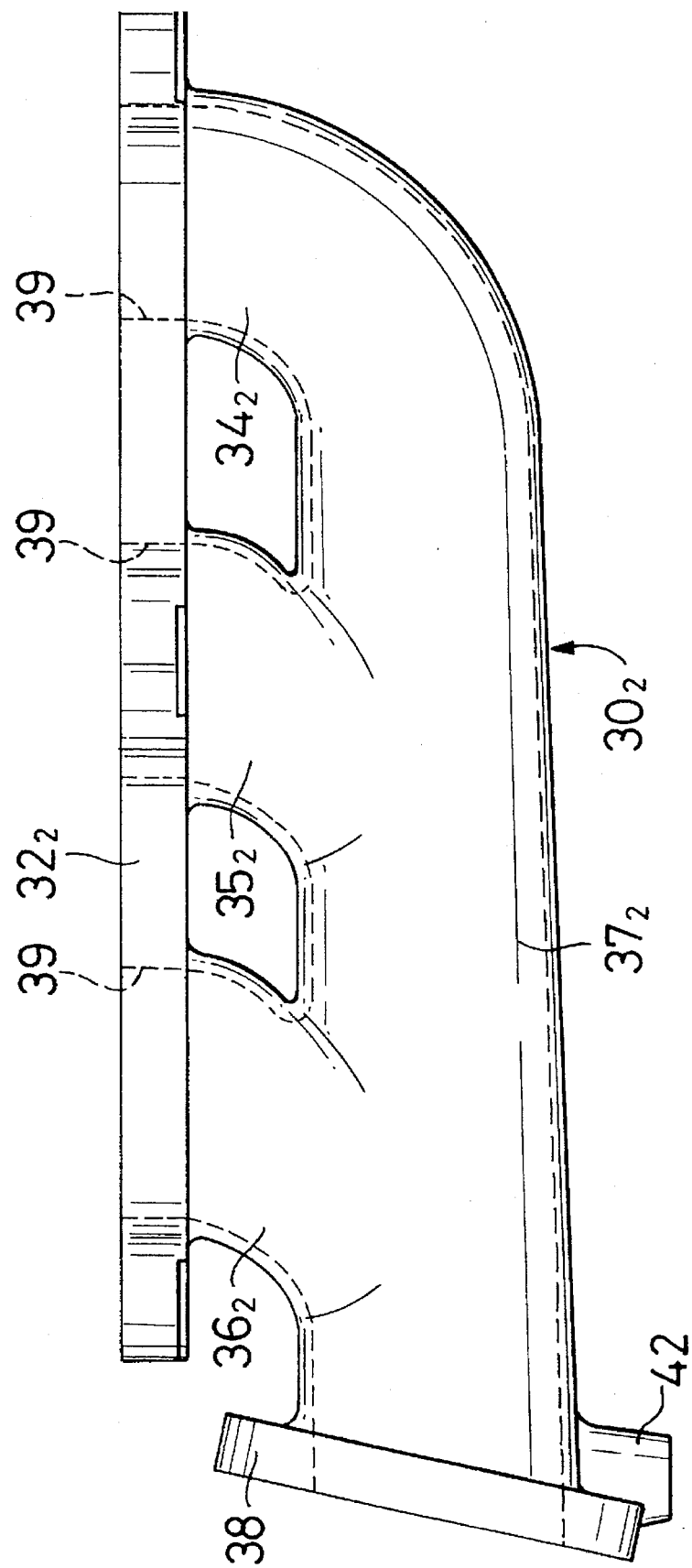
FIG. 12 is a view taken in a direction of an arrow 12 in FIG. 11.
Figure 13:
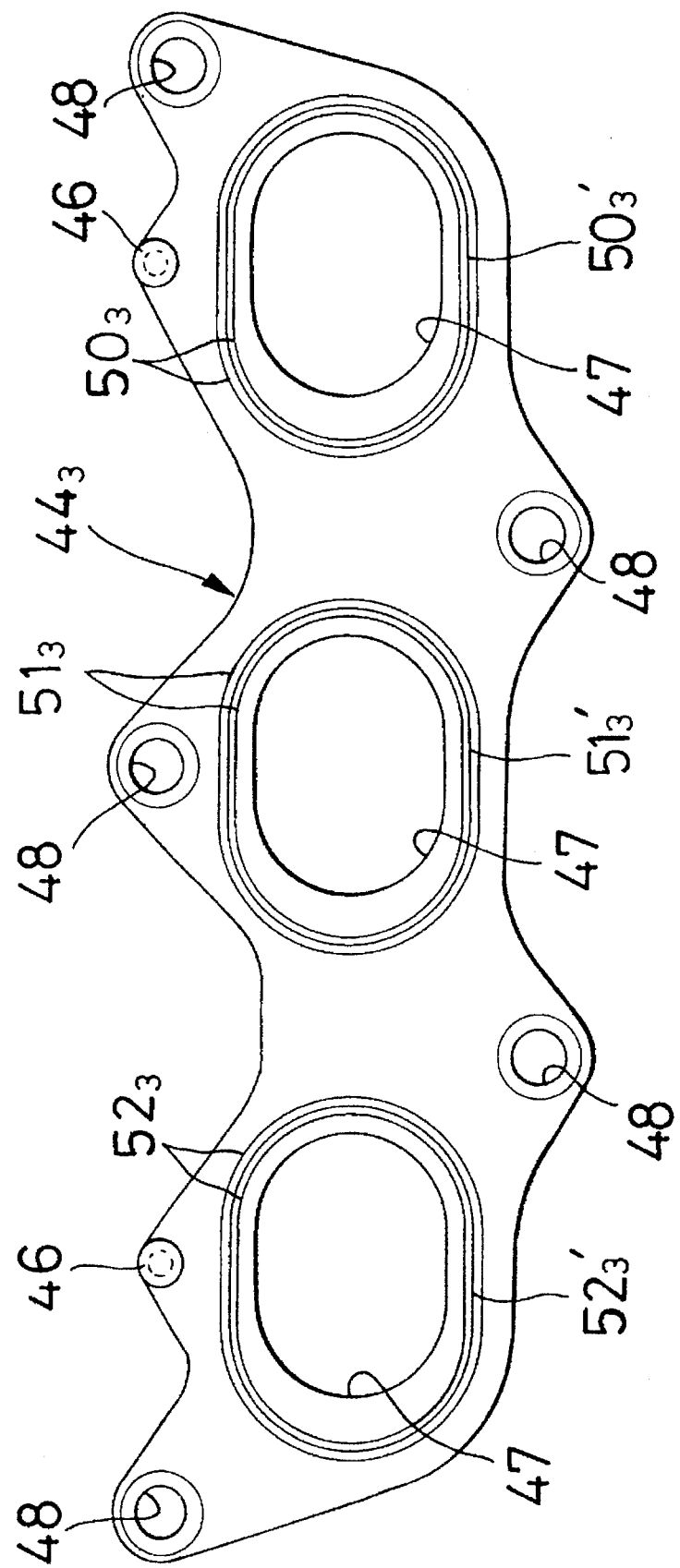
FIG. 13 is a front view of a gasket.

FIGS. 11 to 13 illustrates a third embodiment of the present invention. In the third embodiment, an exhaust manifold $30_2$ is formed by casting and is integrally provided with a flange $32_2$ for fastening to the cylinder head 23 (see FIG. 1). Three exhaust pipes $34_2$, $35_2$, and $36_2$ are coupled at one end thereof to the flange $32_2$ in correspondence to the exhaust ports 28 (see FIG. 1) in the cylinder head 23. A collection pipe $37_2$ is coupled to the other ends of the exhaust pipes $34_2$, $35_2$, $36_2$, and a flange 38 is coupled to the collection pipe $37_2$ for flange-coupling to the collective exhaust pipe 31 (see FIG. 1).

Each of the exhaust pipes $34_2$, $35_2$, and $36_2$ is formed into a shape in which they are curved in the same direction within a plane extending in a direction of the arrangement of the communication holes 39 in the flange $32_2$.

Sealing points $50_3'$, $51_3'$, and $52_3'$ and sealing portions $50_3$, $50_3$; $51_3$, $51_3$; and $52_3$, $52_3$ located at the ends of inclined planar surface portions on opposite sides of the sealing points $50_1'$, $51_1'$ and $52_1'$ are provided on opposite surfaces of a gasket $44_3$ clamped between the flange $32_2$ of the exhaust manifold $30_2$ and the cylinder head 23, to surround holes 47 corresponding to the communication holes 39 in the flange $32_2$. Moreover, each of the sealing portions $50_3$, $50_3$; $51_3$, $51_3$; and $52_3$, $52_3$ is formed into an endless shape to surround the holes 47, i.e., the exhaust port 28, such that the distance between the sealing portion and a peripheral edge of the holes 47, i.e., the exhaust port 28, at a location substantially corresponding to a projected position of each of the curved exhaust pipe $34_2$, $35_2$, and $36_2$ on the flange $32_2$, is larger than the distance at other locations.

Even in the third embodiment, an effect similar to that in the first embodiment can be provided.

Figure 14:
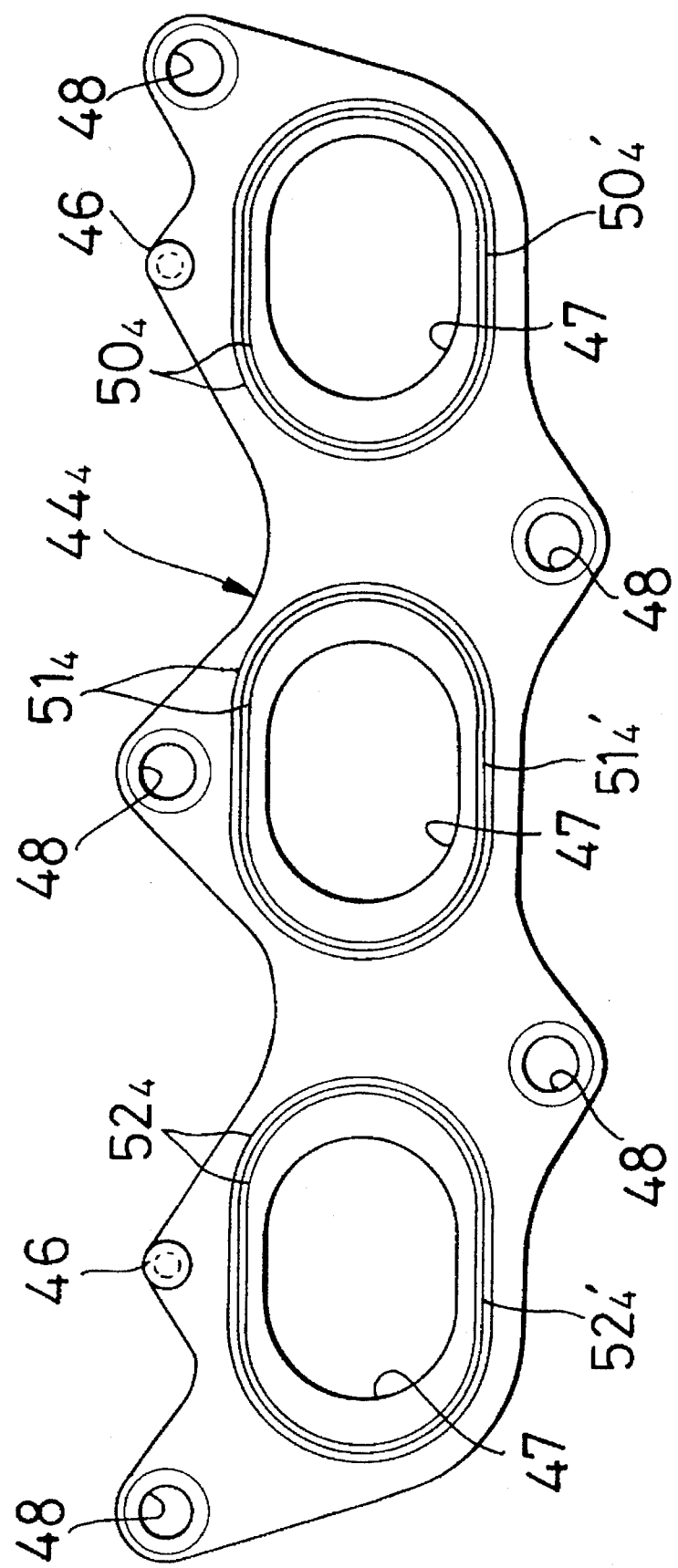
FIG. 14 is a front view of a gasket according to a fourth embodiment of the present invention.

FIG. 14 illustrates a fourth embodiment of the present invention. In the fourth embodiment, sealing points $50_4'$, $51_4'$, and $52_4'$ and sealing portions $50_4$, $50_4$; $51_4$, $51_4$; and $52_4$, $52_4$ located at the ends of inclined planar surface portions on opposite sides of the sealing points $50_4'$, $51_4'$, and $52_4'$ are provided on opposite surfaces of a gasket $44_4$ which is clamped between a flange $32_2$ of an exhaust manifold $30_2$, of the same type as in the third embodiment, and the cylinder head 23 to surround holes 47 corresponding to the communication holes 39 in the flange $32_2$. Moreover, each of the sealing portions $50_4$, $50_4$ is formed into an endless shape to surround the holes 47, such that the distance between the sealing portion $50_4$ and a peripheral edge of the holes 47, i.e., the exhaust port 28 at a location substantially corresponding to a projected position of the curved exhaust pipe $34_2$ on the flange $32_1$, is larger than the distance at other locations. Each of the sealing portions $51_4$, $51_4$ is also formed into an endless shape to surround the holes 47, such that the distance between the sealing portion $51_4$ and a peripheral edge of the exhaust pipe 28, at a location substantially corresponding to a projected position of the curved exhaust pipe $35_2$ on the flange $32_2$, as well as on the opposite side from the projected position of the curved exhaust pipe $35_2$ on the flange $32_2$ and on the side adjoining the exhaust pipe $35_2$, is larger than the distance at other locations. Further, each of the sealing portions $52_4$, $52_4$ is also formed into an endless shape to surround the holes 47, such that the distance between the sealing portion $52_4$ and a peripheral edge of the holes 47, i.e., the exhaust pipe 28 at a location substantially corresponding to a projected position of the curved exhaust pipe $36_2$ on the flange $32_2$, as well as on the opposite side from the projected position of the curved exhaust pipe $36_2$ on the flange $32_2$, is larger than at other locations.

In the fourth embodiment, an effect similar to that in the first to third embodiments can be provided. Moreover, the sealing points $51_4'$, $52_4'$ and the sealing portions $51_4$, $51_4$ and $52_4$, $52_4$ on opposite sides of the sealing points $51_4'$, $52_4'$ are in positions relatively spaced apart from the exhaust port 28 even on the side of the adjoining exhaust pipes $34_2$ and $35_2$, and therefore, even if there is an influence of heat from the adjoining exhaust pipes $34_2$ and $35_2$, the temperature of the sealing points $51_4'$ and $52_4'$ can be prevented from locally rising and thus, the deterioration of the sealing portions $51_4$, $51_4$ and $52_4$, $52_4$ can be minimized or prevented.

Figure 15:
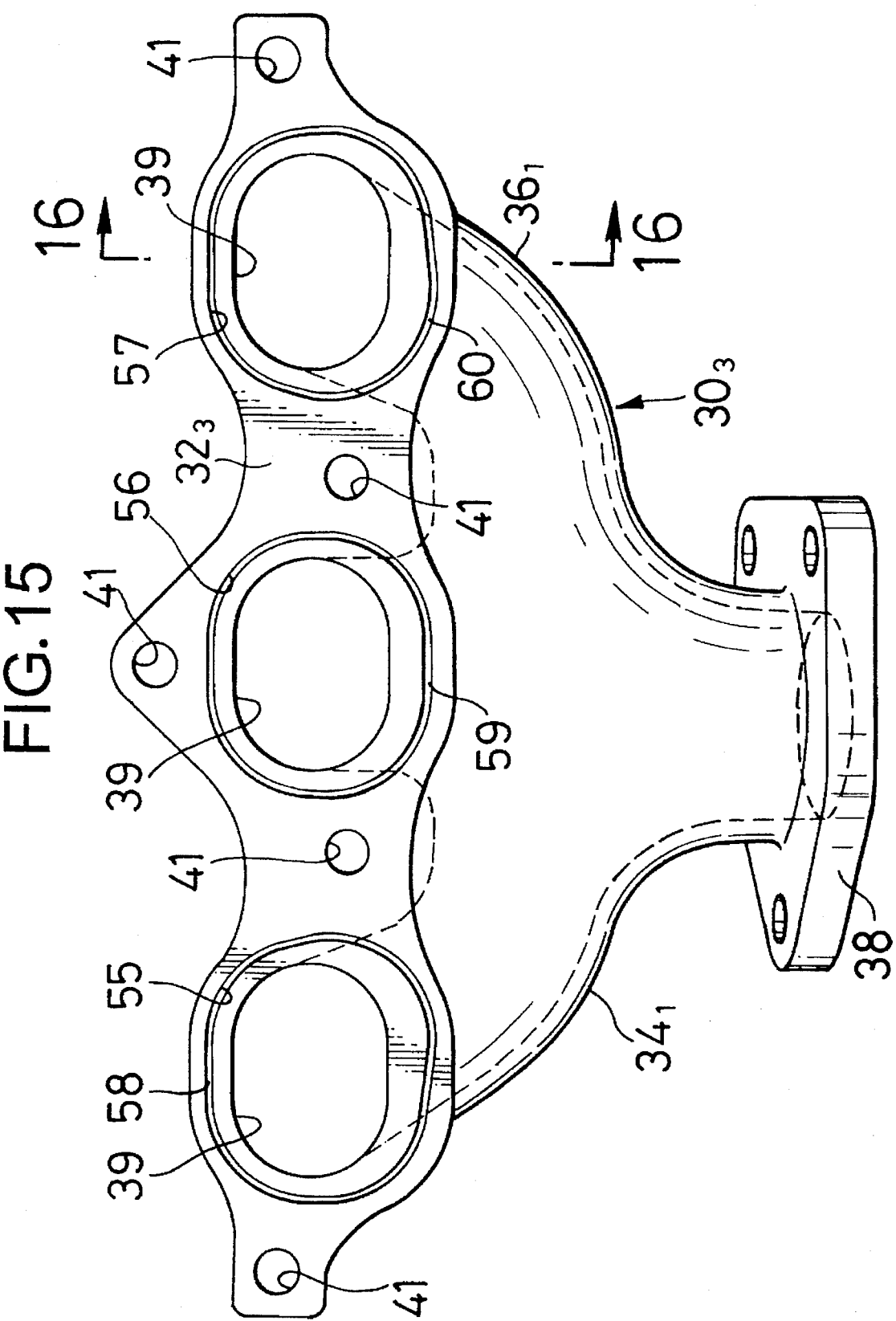
FIG. 15 is a front view of an exhaust manifold, similar to FIG. 3, but according to a fifth embodiment of the present invention.
Figure 16:
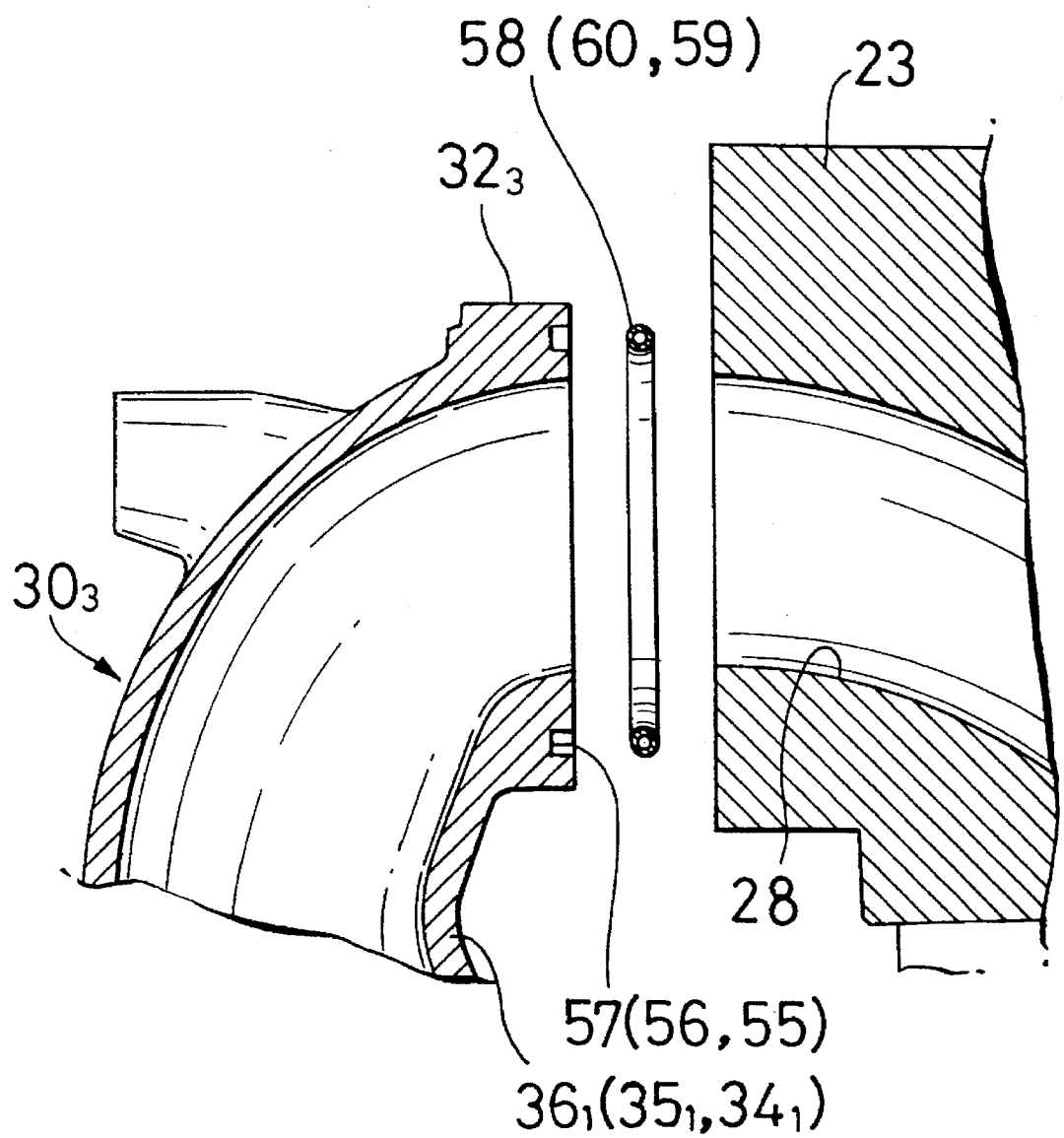
FIG. 16 is a sectional view taken along a line 16—16 in FIG. 15.

FIGS. 15 and 16 illustrate a fifth embodiment of the present invention. In the fifth embodiment, an exhaust manifold $30_3$ is formed by casting, and integrally provided with a flange $32_3$ for fastening to the cylinder head 23. Three exhaust pipes $34_1$, $35_1$, and $36_1$ are coupled at one end thereof to the flange $32_3$ in correspondence to the exhaust portions 28 (see FIG. 1) in the cylinder head 23, and are coupled at the other end to a collection pipe $37_1$, and a flange 38 is coupled to the collection pipe $37_1$ for flange-coupling to the collective exhaust pipe 31 (see FIG. 1).

Endless sealing grooves 55, 56, and 57 are provided in a surface of the flange $32_3$ of the exhaust manifold $30_3$ on the side of the cylinder head 23 to surround the holes 47 corresponding to communication holes 39. Ring gaskets 58, 59, and 60 are mounted in the sealing grooves 55, 56, and 57 and are clamped between the flange $32_3$ and the cylinder head 23.

Each of the ring gaskets 58, 59, and 60 has a portion of contact with the flange $32_3$ and the cylinder head 23, which is a sealing portion. The sealing portion, i.e., each of the entire ring gaskets 58, 59, and 60, is formed into an endless shape such that the distance between the ring gasket and a peripheral edge of the holes 47, i.e., the exhaust portion 28, is largest at a location corresponding to a projected position of each of the curved exhaust pipes $34_1$, $35_1$, and $36_1$ on the flange $32_3$ and is non-uniform in a circumferential direction. Each of the sealing grooves 55, 56, and 57 is also formed into a shape corresponding to that of each ring gaskets 58, 59, 60.

Even in the fifth embodiment, it is possible to prevent the temperature of each gasket 58, 59, 60 from locally rising due to the curvature of the exhaust pipes $34_1$, $35_1$, and $36_1$ and thus to prevent or minimize the deterioration of the ring gaskets 58, 59 and 60.

The present invention is also applicable to an exhaust system using a liquid gasket, an exhaust system including a steel pipe coupled to a flange, and an exhaust system including a single exhaust pipe coupled to a flange.

Although the embodiments of the present invention have been described in detail, it will be understood that the present invention is not limited to the above-described embodiments, and various modifications in design may be made without departing from the spirit and scope of the invention defined in the claims.

We claim:

1. A sealing structure in an exhaust system of an internal combustion engine, having a cylinder head with at least one exhaust port therein, said exhaust system including an exhaust manifold having at least one curved exhaust pipe, the opening of said exhaust pipe corresponding to said exhaust port, and a flange for connecting said exhaust manifold to said cylinder head, said sealing structure comprising a gasket having a sealing portion, for clamping between said flange and said cylinder head wherein said sealing portion of said gasket has an endless shape surrounding said exhaust port in contact with said flange on one side thereof and in contact with said cylinder head on the other side thereof, and wherein the distance between said sealing portion and the peripheral edge of said exhaust port at a location corresponding to a projected position of said exhaust pipe onto said flange is larger than the distance at other locations around the peripheral edge.

2. A sealing structure as set forth in claim 1, wherein said gasket comprises two metal plates and coupling means for coupling said plates in contact with each other.

3. A sealing structure as set forth in claim 2, wherein each of said metal plates has sealing points which contact corresponding sealing points on the other metal plate.

4. A sealing structure as set forth in claim 3, wherein said metal plate includes inclined portions extending from said sealing points to said sealing portions.

5. A sealing structure as set forth in claim 1, wherein said at least one exhaust pipe is three exhaust pipes and wherein the location where the distance is larger from the first exhaust pipe is located on the side of the first exhaust pipe which is closer to the second exhaust pipe and the location where the distance is larger from the third exhaust pipe is located on the side of the third exhaust pipe which is closer to the second exhaust pipe.

6. A sealing structure as set forth in claim 1, wherein said at least one exhaust pipe is at least two exhaust pipes, and wherein the location where the distance is larger from the exhaust pipe is located on the same side of said at least two exhaust pipes.

* * * * *